United States Patent [19]
Willeke

[11] Patent Number: 5,904,752
[45] Date of Patent: May 18, 1999

[54] METHOD FOR COLLECTING AIRBORNE PARTICLES AND MICROORGANISMS BY THEIR INJECTION INTO A SWIRLING AIR FLOW

[75] Inventor: Klaus Willeke, Cincinnati, Ohio

[73] Assignee: SKC, Inc., Eighty Four, Pa.

[21] Appl. No.: 08/880,254

[22] Filed: Jun. 23, 1997

[51] Int. Cl.$^6$ .................................................. B01D 45/10
[52] U.S. Cl. .................................. 95/216; 96/324; 96/322; 96/316
[58] Field of Search .............................. 55/434, 447, 462, 55/465, DIG. 14; 95/216; 96/314, 316, 301, 322, 324, FOR 125, FOR 127, FOR 128, FOR 130

[56] References Cited

U.S. PATENT DOCUMENTS

| | | | |
|---|---|---|---|
| 3,518,815 | 7/1970 | McFarland et al. | 55/465 |
| 3,898,068 | 8/1975 | McNeil | 55/462 |
| 3,920,422 | 11/1975 | Pircon | 96/324 |
| 4,902,318 | 2/1990 | Stevens et al. | 55/462 |

FOREIGN PATENT DOCUMENTS

| | | | |
|---|---|---|---|
| 399646 | 2/1922 | Germany | 96/FOR 127 |
| 52-64069 | 5/1977 | Japan | 55/462 |
| 703122 | 12/1979 | Russian Federation | 55/465 |

*Primary Examiner*—Jay H. Woo
*Assistant Examiner*—Robert Hopkins
*Attorney, Agent, or Firm*—William L. Krayer

[57] ABSTRACT

A method for collecting airborne particles and microorganisms by injecting them into a swirling air flow from where they are removed onto a dry surface, a surface coated with an adhesive material or a surface wetted by a liquid that is swirled onto that surface from a liquid reservoir below. The swirling air motion and the aerosol injection into it are achieved by pushing or drawing the airborne particles and microorganisms through one or more nozzles that are directed at an angle towards the collection surface.

10 Claims, 9 Drawing Sheets

COLLECTION OF TEST PARTICLES BY THEIR INJECTION INTO A SWIRLING AIR FLOW. CURVE A: 20 mL OF WATER AS COLLECTION FLUID; CURVE B: 10 mL OF GLYCEROL. FOR COMPARISON, CURVE C IS FOR COLLECTION INTO 20 mL OF WATER IN AN ALL-GLASS-IMPINGER AGI-30. PLOTTED ON LINEAR-LOG PAPER.

FIG. 4

THE EFFECT OF SAMPLING TIME ON THE VOLUME OF REMAINING COLLECTION FLUID.

FIG. 5

REAEROSOLIZATION OF COLLECTED PARTICLES. PLOTTED ON LINEAR-LOG PAPER.

FIG. 6

EFFECT OF THE NUMBER OF NOZZLES, n, ON THE COLLECTION EFFICIENCY. PLOTTED ON LINEAR-LOG PAPER.

FIG. 7

EFFECT OF ANGLE θ ON THE COLLECTION OF 0.5 μm PARTICLES IN 20 mL WATER.

FIG. 8a.

EFFECT OF ANGLE φ ON THE COLLECTION OF 0.5 μm PARTICLES IN 20 mL WATER.

FIG. 8b

EFFECT OF ANGLE θ ON THE COLLECTION OF 0.5 μm PARTICLES IN 10 mL GLYCEROL.

FIG. 9a

EFFECT OF ANGLE φ ON THE COLLECTION OF 0.5 μm PARTICLES IN 10 mL GLYCEROL.

FIG. 9b

*COLLECTION EFFICIENCY AT DIFFERENT AIR FLOW RATES WHEN THERE IS NO LIQUID IN THE COLLECTION VESSEL AND ITS INNER SURFACE IS COATED WITH A THIN LAYER OF PETROLEUM JELLY. PLOTTED ON LINEAR-LOG PAPER.*

FIG. 10

COLLECTION EFFICIENCIES FOR PARTICLE COLLECTION ON DRY, UNCOATED SURFACES. PLOTTED ON LINEAR-LOG PAPER.

FIG. 11

METHOD FOR COLLECTING AIRBORNE PARTICLES AND MICROORGANISMS BY THEIR INJECTION INTO A SWIRLING AIR FLOW

CROSS-REFERENCES TO RELATED APPLICATIONS

Two related co-applicants are entitled "SWIRLING AEROSOL COLLECTOR," AND "METHOD FOR CONCENTRATING AIRBORNE PARTICLES AND MICROORGANISMS BY THEIR INJECTION INTO A SWIRLING AIR FLOW."

STATEMENT AS TO THE RIGHTS TO INVENTIONS MADE UNDER FEDERALLY-SPONSORED RESEARCH AND DEVELOPMENT

This invention was not made as part of any federally sponsored research.

BACKGROUND OF THE INVENTION

1. Field of the Invention

The present invention relates to the methods of collecting airborne particles and microorganisms. In particular, the present invention relates to the method of collecting aerosol particles by injecting them into a swirling air flow so that they are removed from the suspending air onto the surface over which the flow swirls.

2. Description of the Related Art

Prominent methods by which airborne particles and microorganisms are collected for measurement or control purposes are by inertial impaction, centrifugal removal or impingement into a liquid. Particles or microorganisms suspended in air are herein referred to as "aerosol particles." In inertial impaction, the aerosol particles are drawn into a nozzle which is directed toward a solid plate; aerosol particles with high inertia impact onto the plate and are collected by it. The embodiment of this method is usually referred to as an "inertial impactor." A common problem with the impactor is the bounce of particles from the surface when the force of particle rebounding exceeds the particle adhesion force.

Another method is that of aerosol particle removal by centrifugal force. The embodiment of this method is usually referred to as a "cyclone." In a cyclone, the aerosol is drawn into a cylindrical chamber so that the air makes one or more rotations inside before leaving the chamber through a tube at its center. Particles with sufficient inertia move centrifugally toward the inner wall. The problem with this method is that particles that enter the cyclone near its inner effluent tube have a great radial distance to traverse. This method is, therefore, not effective for particles less than a few micrometers in diameter. Also, it does not provide a sharp particle size separation between the collected and uncollected particles.

A third method is that of aerosol particle impaction into a liquid. The embodiment of this method is usually referred to as an "impinger." In an impinger, the aerosol is impacted into a reservoir filled with liquid. The problem with this method is that the air flow produces bubbling in the liquid reservoir through which already collected particles may be reaerosolized into the effluent air flow. An impinger is commonly used only with liquids having the viscosity and surface tension characteristics of water or similar liquids.

SUMMARY OF THE INVENTION

The method of the present invention consists of drawing airborne particles or microorganisms into one or more nozzles that are directed at an angle toward the inner surface of a cylindrical vessel or wall. The airborne particles may be solid or liquid, have any shape, and may be biologically or chemically active or inert. This includes particles such as dust, fume, fog, mist, smoke, and smog, and microorganisms such as bacterial cells, fungal spores, pollen grains, viruses, mites, and bacterial fragments. All of the above are herein referred to as aerosol particles. The air flow velocity through the exit plane of the nozzle or nozzles is chosen such that the aerosol particles are thrown at an angle toward the inner surface. The particles that do not quite reach the inner surface are removed by the centrifugal force of the swirling flow. Submicrometer-sized particles may also move across the last short distance by diffusional motion. The inner surface of the vessel may be dry or it may have a thin layer of oil or other adhesive substance applied to it. The vessel may also contain a liquid which is swirled upward on the inner surface by the swirling air flow so that the inner surface is wetted in the region where the airborne particles and microorganisms reach the wall. If a gradual particle size separation is desired, the air flow through each nozzle, and the spacing and geometry of each nozzle relative to the collection surface are chosen so that each nozzle affects a different particle size separation.

Thus, one object of the invention is to have little or no particle bounce from the inner surface, in contrast to the impactor.

Another object of this invention is to be able to remove smaller particles than is possible with the cyclone.

Another objective is to have the choice between sharp or gradual particle size separation between the collected and uncollected particles.

Another objective is to have no or minimal reaerosolization of particles and microorganisms when they are collected into a liquid.

An additional objective is to be able to use a wide range of viscosity and surface tension in liquids used for collection, so that no or minimal liquid evaporation occurs during sampling.

Another objective is to collect the particles and microorganisms on a surface that is dry or coated with an adhesive substance, if collection into a liquid is not desired.

DESCRIPTION OF THE PREFERRED EMBODIMENTS

Figure 1:
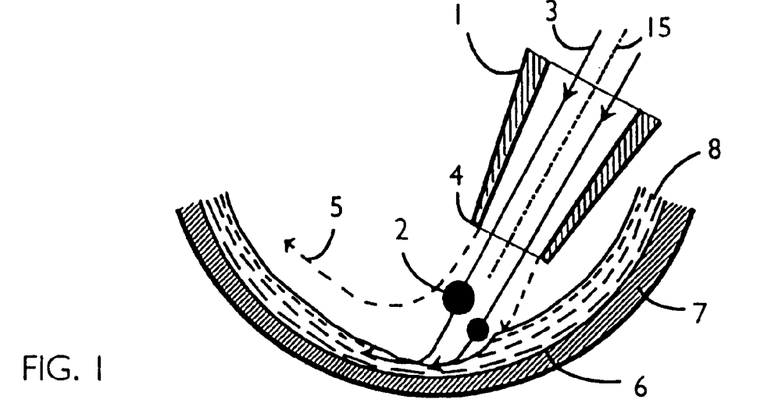
FIG. 1 is a top cross-sectional view illustrating the method of collecting airborne particles and microorganisms by their injection into a swirling air flow.

FIG. 1 is a top cross-sectional view that illustrates the method of collecting airborne particles and microorganisms by their injection into a swirling air flow. Air and airborne particles and microorganisms are drawn into nozzle 1 where the particles and microorganisms 2 follow the particle trajectories 3, indicated by solid lines. The aerosol flow is ejected from nozzle 1 through exit plane 4 along nozzle axis 15. The ejected air is bounded by limiting stream lines 5, indicated by dashed lines. The air flow is laterally deflected by the inner surface 6 of the curved containing wall 7 and by the swirling flow from previously ejected air. The particles and microorganisms 2 are thrown towards the curved inner surface 6 where they are collected by a combination of impaction, centrifugal and diffusional forces. As the aerosol is injected into the swirling air motion, centrifugal forces move the uncollected particles 2 towards the inner surface 6. Inner surface 6 may be smooth or rough, and may be dry or have a very thin sticky coating applied to it to improve adhesion of the collected particles 2 to the inner surface 6. If the curved wall 7 is part of a vessel, liquid 8 may be inserted into the vessel. The swirling air motion moves liquid 8 upward in the vessel so that there is a thin layer of liquid on inner surface 6 in the collection region. Particles and microorganisms 2 collected by this liquid 8 are carried out of the collection zone by the motion of liquid 8. The material of the nozzle 1 and the collecting wall 7 may be made of any solid substance. When using this method with microorganisms, autoclavable material such as glass, steel or temperature-resistant plastic is preferable.

Figure 2:
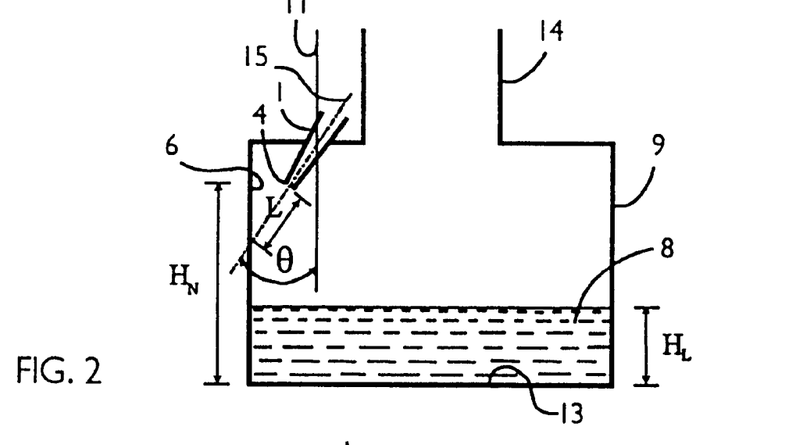
FIG. 2 is a side elevation with one injection nozzle shown relative to the collection surface.
Figure 3:
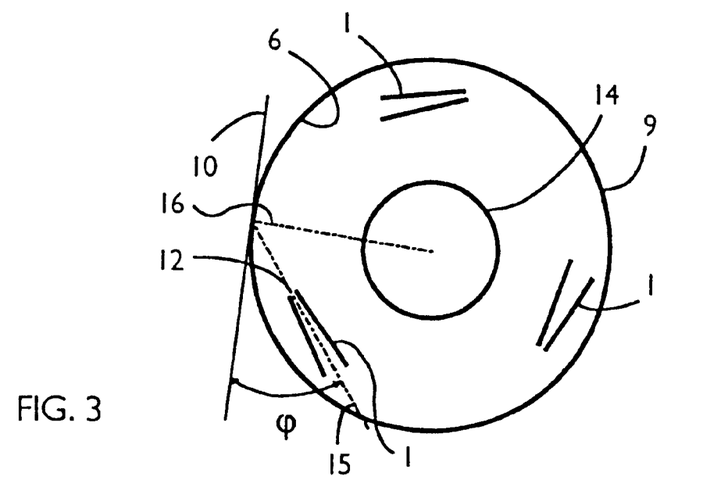
FIG. 3 is a top view showing the placement of three nozzles establishing the swirling air flow and injecting the airborne particles and microorganisms.

FIG. 2 is a side elevation and FIG. 3 is a top view of a typical embodiment with the significant dimensions labeled. One or more nozzles 1 establish the swirling flow along the inner surface 6 of the vessel 9. Each nozzle axis 15 is aligned at angle φ to inner surface tangential 10, and at angle θ to the vertical 11. Surface tangential 10 is perpendicual to radial line 16. Distance L along axis line 15 between nozzle exit plane 4 and inner surface 6, and inner nozzle exit diameter 12 are the same for all nozzles 1 when sharp particle size separation is desired between collected and uncollected particles and microorganisms 2. Dimension L and inner nozzle exit diameter 12 may be different from each other for each nozzle 1, if the particle size separation is to occur over a wide particle size range. The air flow through nozzle exit 4 with inner diameter 12 is at sonic velocity for the collection of small particles or microorganisms, and less than sonic for the collection of larger particles 2. Several of these embodiments—each with a different or the same flow rate, and with different or the same body dimensions, such a L, 12, and the number of nozzles 1—may be operated in series or parallel in order to remove different particle size fractions.

When the typical embodiment shown in FIG. 2 and in FIG. 3 is operated with a liquid collection medium 8 in vessel 9, liquid 8 fills vessel 9 to height $H_L$ before air flow is established, and the exit planes 4 of the nozzles 1 are placed at distance $H_N$ above the bottom 13 of vessel 9. The air flow out of exit port 14 equals the total inflow of air through the nozzles 1.

Angle θ is typically 60 degrees, but may range from 10 to 90 degrees, and angle φ is typically 45 degrees, but may range from 10 to 80 degrees. The number of nozzles is one or more. At a typical flow rate of 12.5 Liter min$^{-1}$, distance L along nozzle axis 15 is typically 5 mm, but may range from 1 to 30 mm. When three nozzles 1 are used at a flow rate of 12.5 Liter min$^{-1}$, the inner nozzle exit diameter 12 is typically 0.6 mm or less. For collection into a liquid, the static height $H_L$ is typically 20 mm, and nozzle height $H_N$ is typically 30 mm, when operated at a flow rate of 12.5 Liter min$^{-1}$. A liquid height of 20 mm corresponds to 20 mL of liquid in vessel 9, when the vessel has an inner diameter of 38 mm. All physical dimensions are scalable, depending on the flow rate and the diameter of vessel 9. The method can be used with any curved surface 6.

EXPERIMENTAL EXAMPLES

Unless otherwise noted, the experimental examples were performed with the following parameters: flow rate=12.5 Liter min$^{-1}$; number of nozzles 1=3; θ=60 degrees; φ=45 degrees; nozzle exit diameter 12=0.6 mm; L=5 mm; $H_N$=30 mm; inner diameter of vessel 9=32 mm; inner diameter of exit tube 14=19 mm; $H_L$=20 mm for 20 mL of water; $H_L$=10 mm for 10 mL of glycerol.

Figure 4:
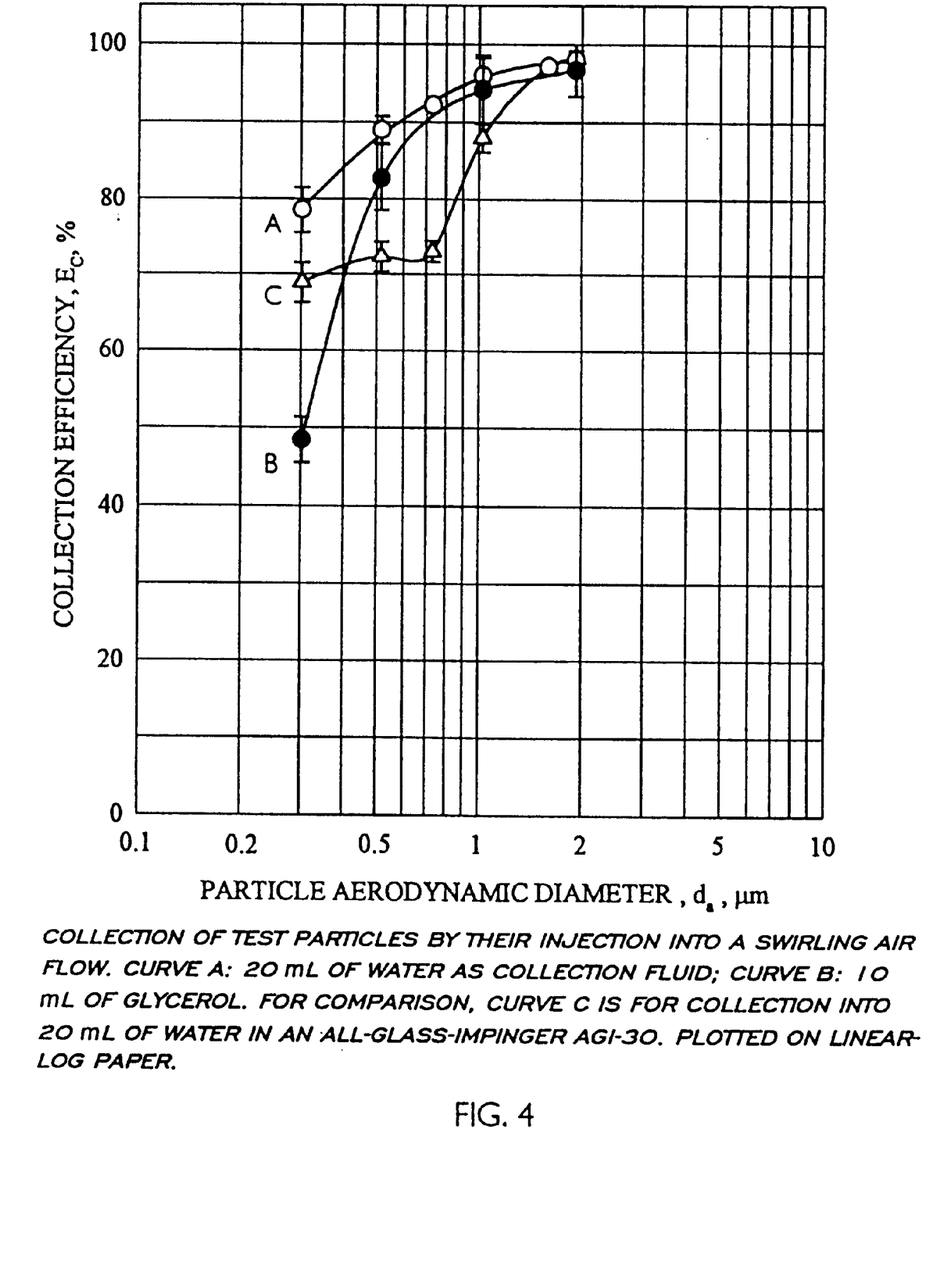
FIG. 4 is a linear-log plot of the collection efficiency of airborne particles and microorganisms collected by the swirling air flow method versus the conventional impingement method.

FIG. 4 shows the collection efficiency, $E_c$, as a function of particle aerodynamic diameter, $d_a$, for the collection of Polystyrene Latex Particles, PSL, suspended in air when this aerosol is injected into a swirling air flow. The collection efficiency is defined as the percentage of particles drawn into the embodiment that is collected inside the embodiment. The flow rate and dimensions are as given above. Curve A is for collection in a vessel 9 filled with 20 mL of water. Curve B is for collection in a vessel 9 filled with 10 mL of glycerol. For comparison, curve C shows the collection efficiency for an all-glass-impinger, AGI-30, tested with PSL particles at the same air flow rate of 12.5 Liter min$^{+1}$. For instance, for 0.5 μm diameter particles, collection by the swirling air method, curves A and B, gives a higher collection efficiency than by the impingement method, curve C. The viscosity of glycerol is about three decades higher than that of water. The collection efficiency is seen to be only moderately affected by this large difference in viscosity, curve B versus curve A. The all-glass-impinger can not be used with glycerol or any other liquid whose viscosity is much higher than that of water.

Figure 5:
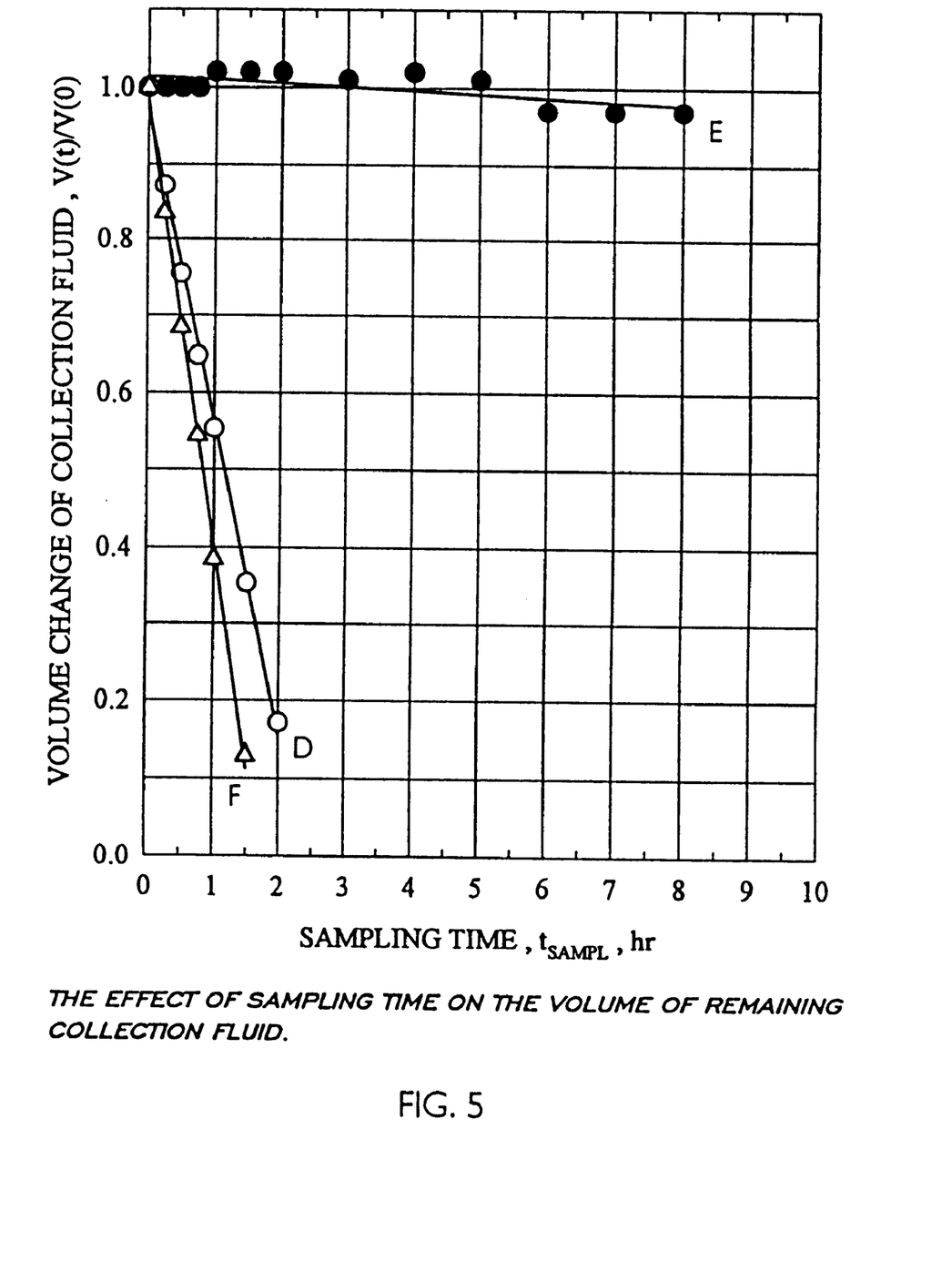
FIG. 5 is a graph showing the effect of sampling time on the volume of the remaining collection fluid.

FIG. 5 shows the change in volume, V, of the collection fluid with sampling time, $t_{SAMPL}$. The curves are for the same conditions as in FIG. 4. The initial volume, V(O), is 20 mL of water for curves D and F, and 10 mL of glycerol for curve E. Curves D and E are for the embodiment with swirling air motion, and curve F is for the impingement method. FIG. 5 shows that the swirling air method has a slower liquid volume loss than the impingement method, when the collection liquid 8 is water. In the impingement method, the water bubbles violently and evaporates quickly into the effluent air flow. In addition, liquid is aerosolized by the bubbling action; thus, some liquid is carried away from the liquid reservoir in the form of liquid droplets. In the swirling air method, the liquid is swirled with little or no bubbling and with little or no aerosolization of the liquid. Thus, there is less water loss, curve D versus curve F. When the swirling air method is used with a liquid that evaporates little or not at all, curve E, the loss of liquid with time is negligible. The impingement method does not collect particles efficiently, when the liquid level is low or when there is no liquid in the reservoir.

Figure 6:
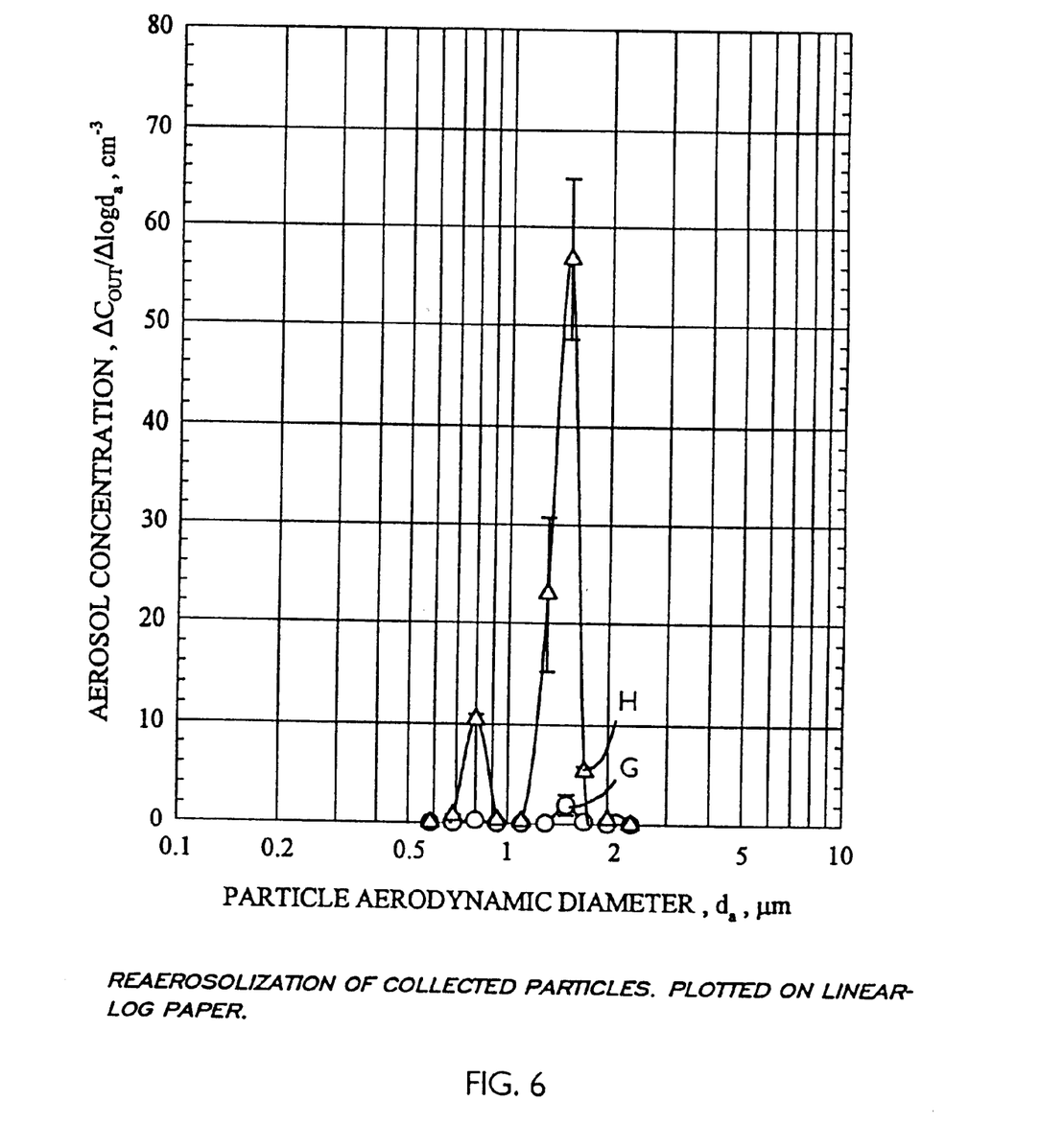
FIG. 6 is a linear-log plot of the reaerosolization of collected particles.

The degree of aerosolization of the liquid and, thus, reaerosolization of already collected particles is shown in FIG. 6. In this experiment, 20 mL of water with a particle concentration of $10^8$ PSL particles per cm$^3$ of liquid was placed into the embodiment of the swirling air method, and the same volume of water with the same particle concentration was placed into the impinger. Curve G is for collection in vessel 9 filled with 20 mL of water, curve H is for collection in vessel 9 filled with 10 mL of glycerol. When the conventionally used air flow of 12.5 Liter min$^{-1}$ passes through the impinger, the concentration of aerosolized particles in the effluent air flow, $C_{OUT}$, is high, curve H. When the same air flow of 12.5 Liter min$^{-1}$ passes through the swirling air embodiment, the concentration of aerosolized particles in the effluent air flow is much lower, curve G. Thus, the swirling air flow method has the advantage of little or no aerosolization of the collection liquid and, therefore, little or no reaerosolization of collected particles.

Figure 7:
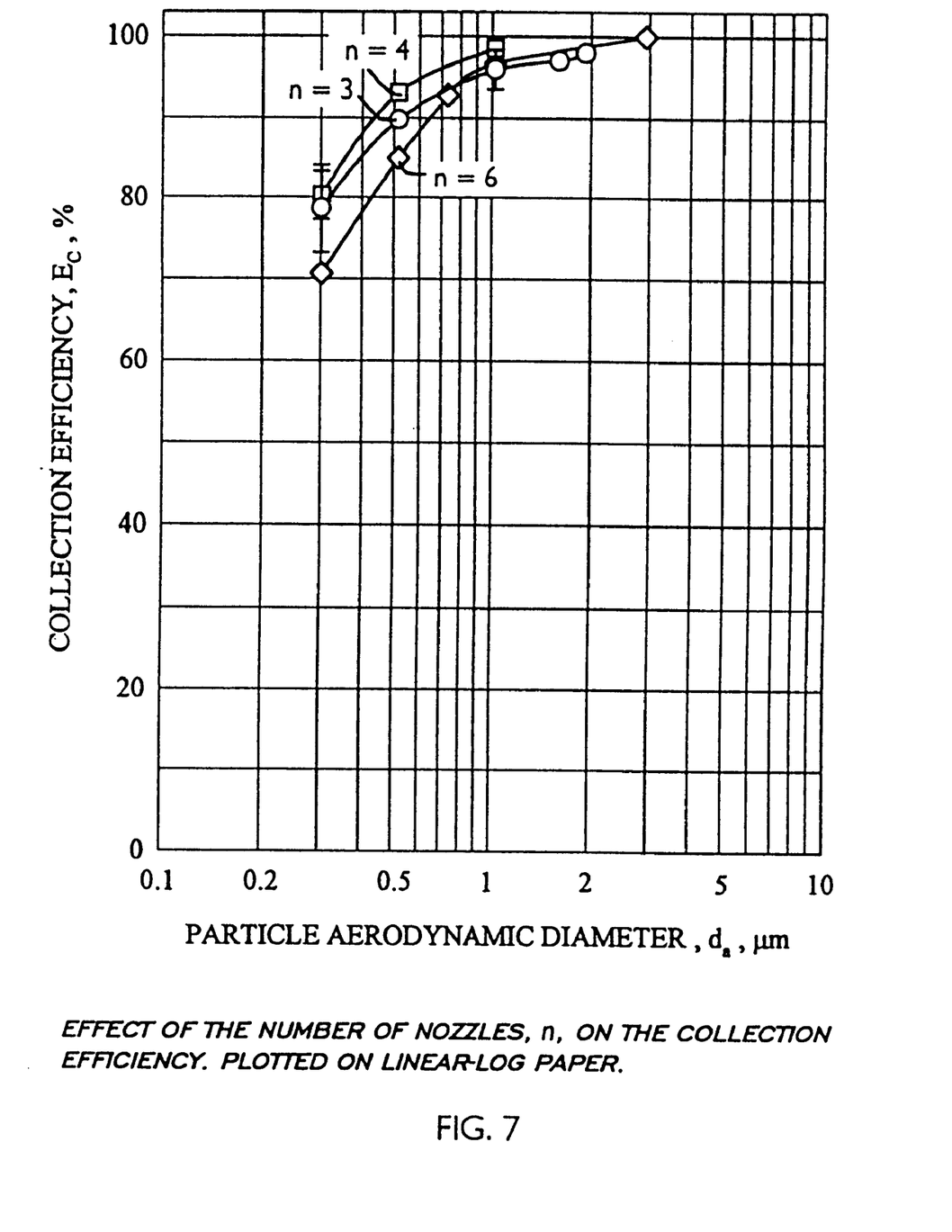
FIG. 7 is a linear-log plot of the effect of the number of nozzles on the collection efficiency.

In FIG. 7, the swirling air embodiment was tested with different numbers, n, of nozzles 1 establishing the swirling air motion and injecting the aerosol particles into this flow. The number of nozzles 1 was 3, 4, or 6. The test were performed with PSL particles, and the collection fluid was 20 mL of water. The measured collection efficiencies are similar for 3, 4, or 6 nozzles 1. From this, it is concluded that the collection efficiency is only moderately dependent on the number of nozzles 1, as long as the nozzles 1 establish a sufficiently strong swirling air flow.

Figure 8A:
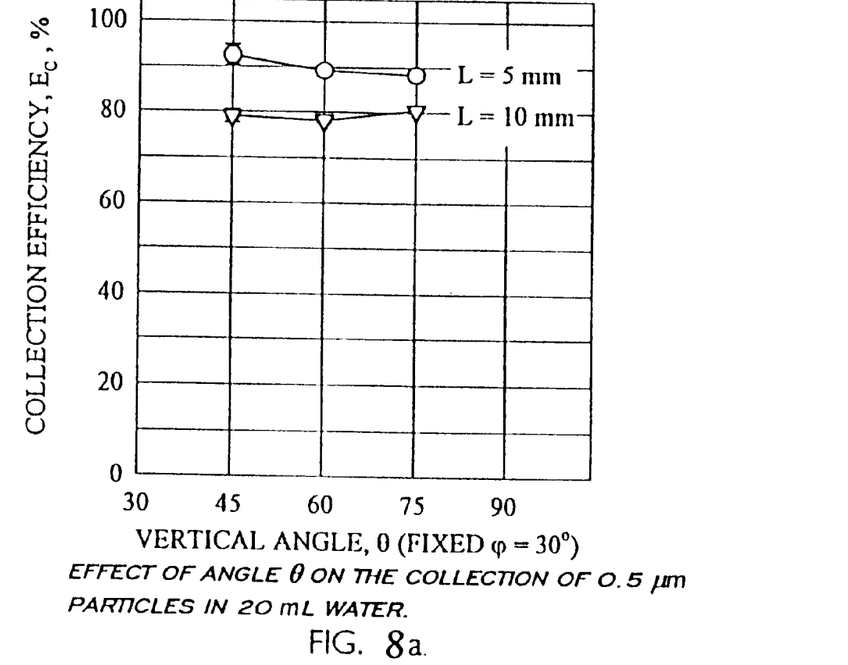
FIGS. 8a and 8b are graphs on the effect of injection angle on the particle collection efficiency in a vessel containing water.
Figure 8B:
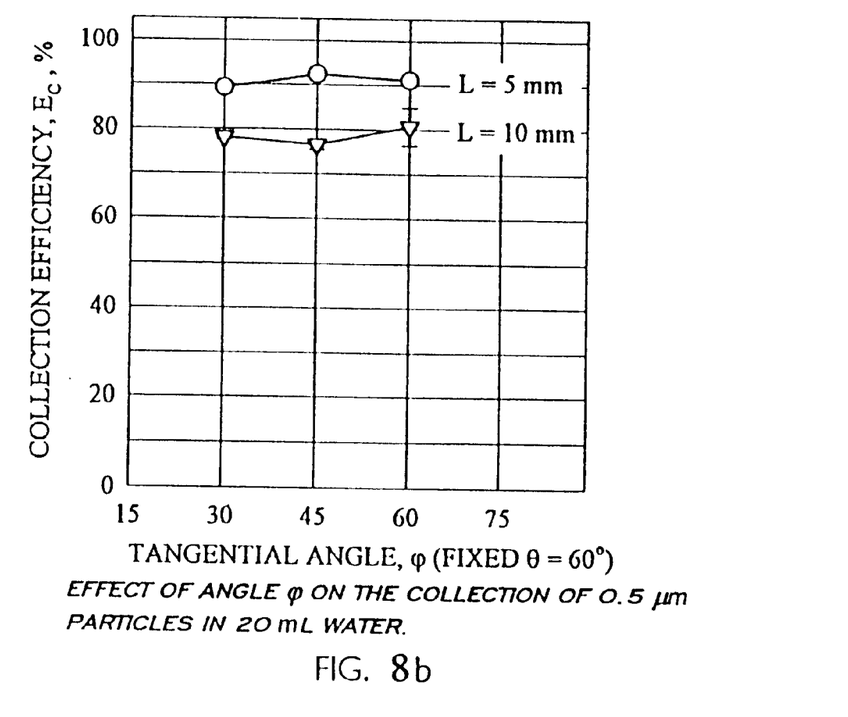

FIG. 8a and FIG. 8b show the data for experiments with 0.5 μm diameter PSL particles when they are injected into a swirling air embodiment filled with 20 mL of water. FIG. 8a shows that the collection efficiency is only moderately dependent on angle θ, and FIG. 8b shows that the collection efficiency is only moderately dependent on angle φ. In both cases, the collection efficiency is higher when the nozzles 1 are located at distance L=5 mm than at distance L=10 mm.

Figure 9A:
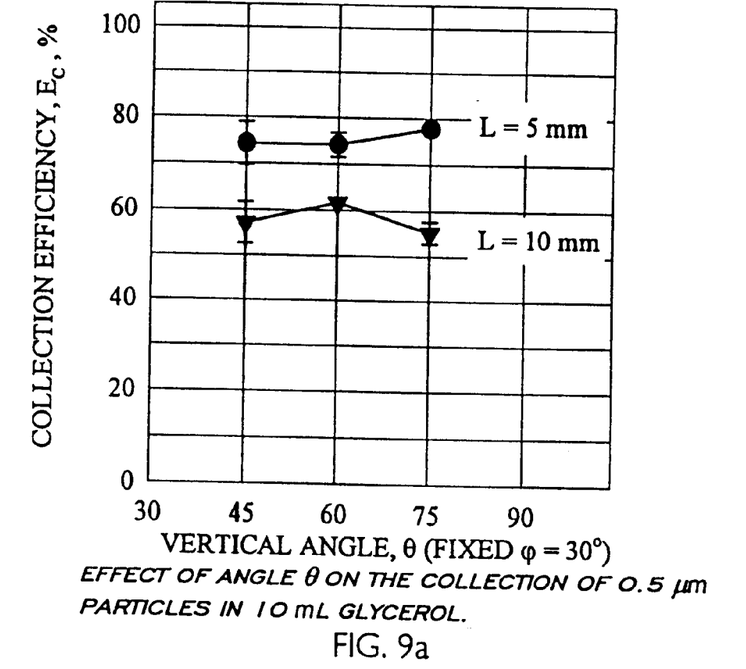
FIGS. 9a and 9b are graphs on the effect of injection angle on the particle collection efficiency in a vessel containing glycerol.
Figure 9B:
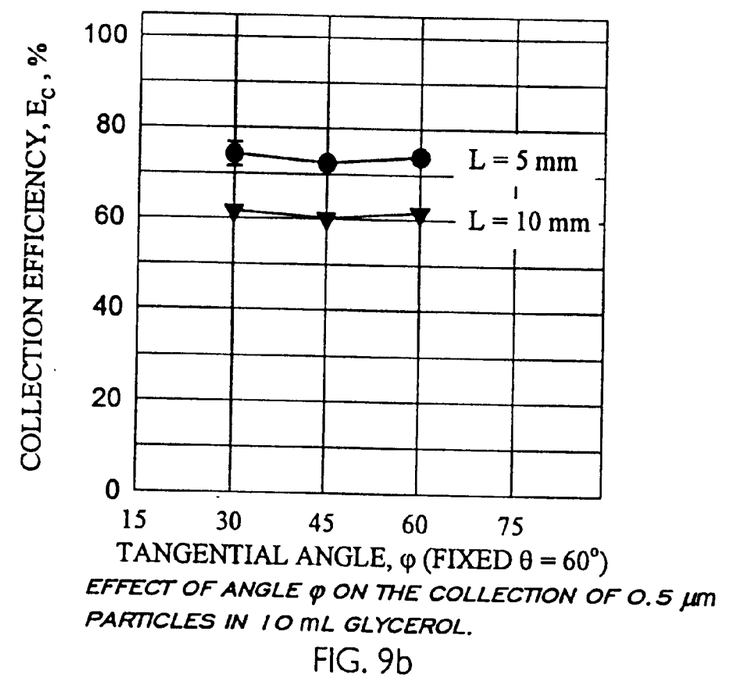

FIG. 9a and 9b are the corresponding data for 0.5 μm PSL particle injection into a swirling air embodiment filled with 10 mL of glycerol. The collection efficiencies for glycerol, whose viscosity is about three decades higher than that of water, are somewhat lower than for water, but the conclusions are the same as for injection into water, FIG. 8a and FIG. 8b. Thus, the swirling air embodiment can be used over a wide range of angle θ and angle φ.

Figure 10:
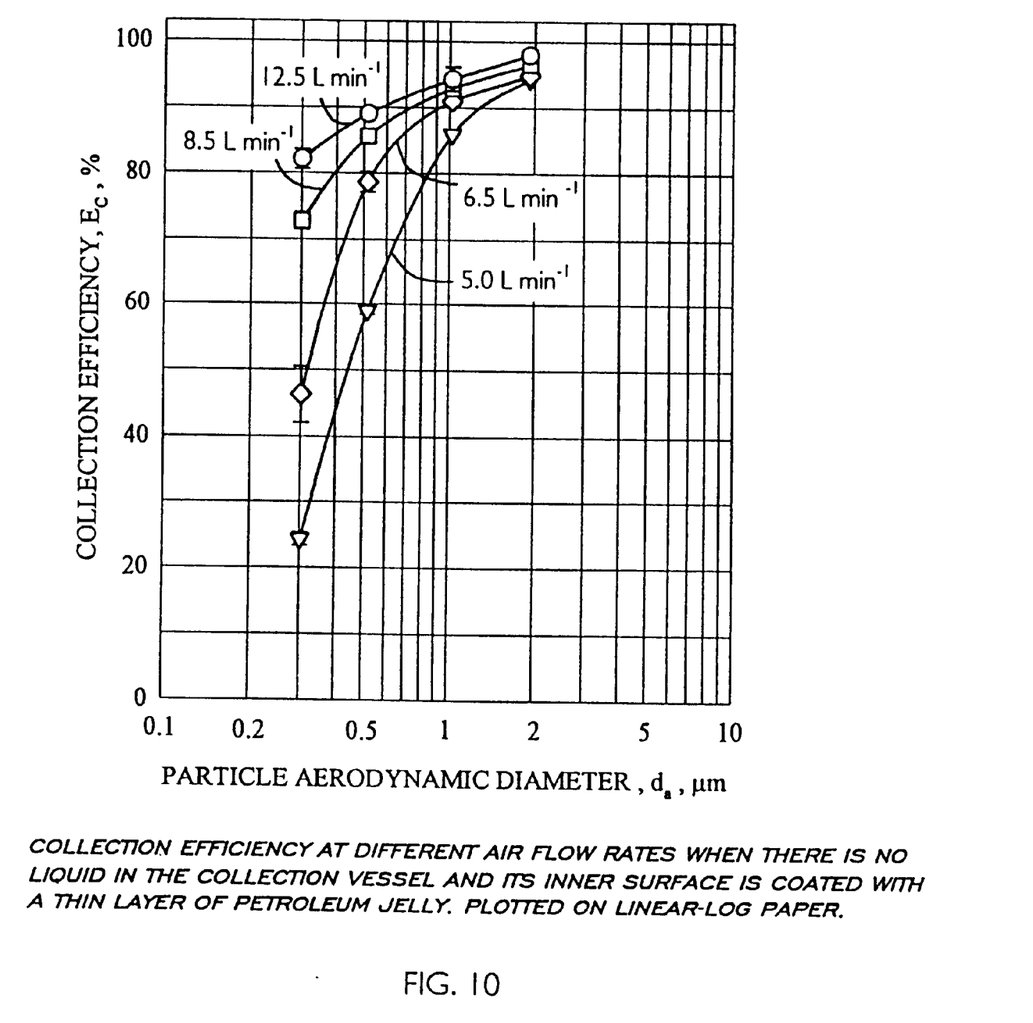
FIG. 10 is a linear-log plot of the particle collection efficiency on a dry surface coated with a thin layer of petroleum jelly.

FIG. 10 shows data for PSL particle collection into a swirling air embodiment that contains no liquid, but has its inner surface 6 coated with a thin layer of petroleum jelly. When operated at an air flow rate of 12.5 Liter min$^{-1}$, the collection efficiency with the coated surface is approximately the same as for collection into the same swirling air embodiment filled with 20 mL of water and operated at the same air flow rate of 12.5 Liter min$^{-1}$, curve A in FIG. 4. It is concluded that aerosol particle collection is approximately the same whether the particles are collected by a surface coated with an adhesive substance or a surface that is wetted by a liquid that is swirled into the collection region of the inner surface 6.

FIG. 10 also shows the effect of different air flow rates on collection efficiency. When the air flow rate is reduced from 12.5 to 5 Liter min$^{-1}$, the collection efficiency of 0.3 μm particles is significantly reduced. For 2 μm particles, however, the collection efficiency is only slightly reduced from a value near 100%. It is concluded that the swirling air embodiment can be used with air velocities less than sonic in the nozzle exit 12, depending on the particle size range that is to be collected by this method.

Figure 11:
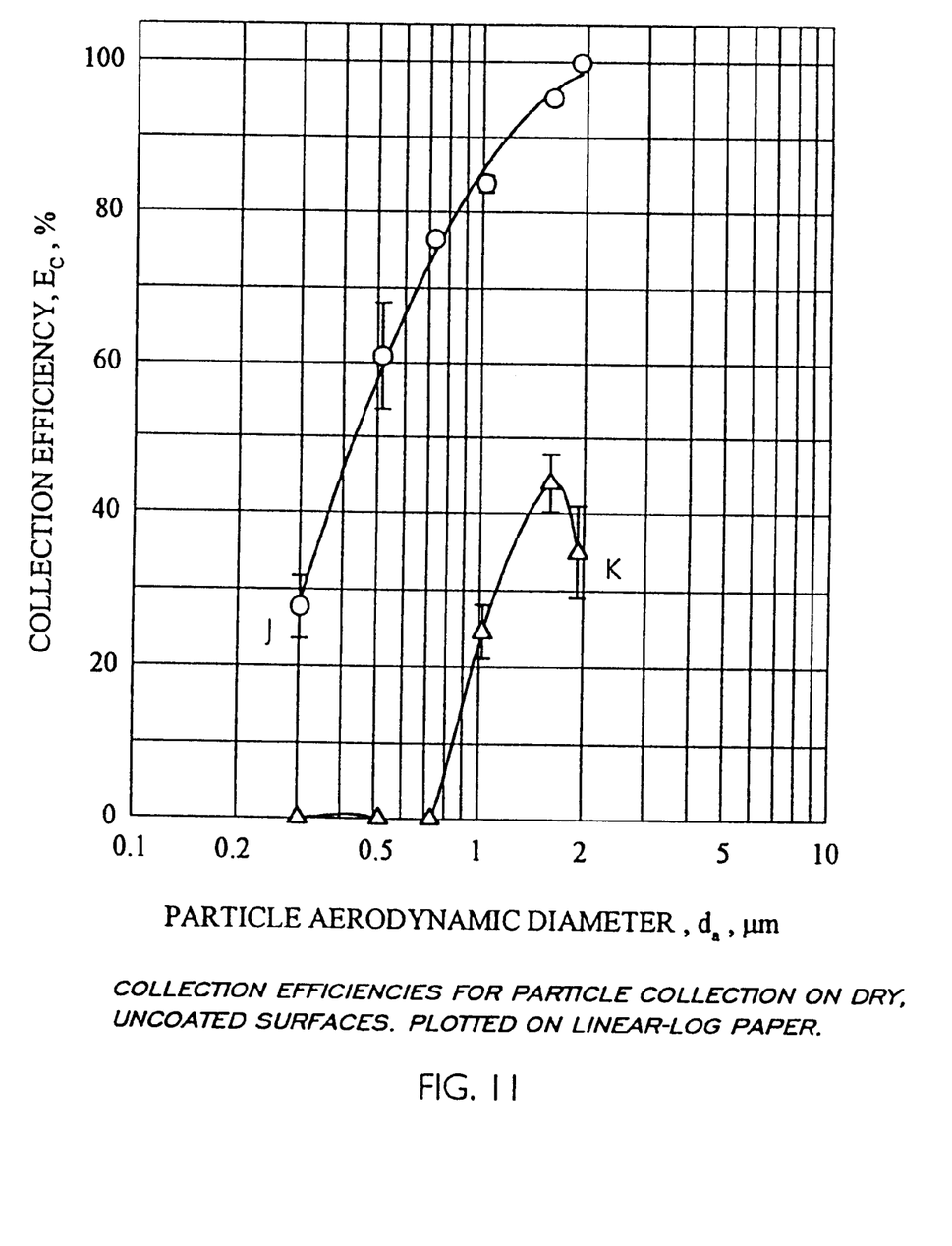
FIG. 11 is a linear-log plot of the particle collection efficiency on a dry, uncoated surface.

Curve J in FIG. 11 shows the collection efficiency for the swirling air embodiment when there is no liquid in the collection vessel 9, and its inner surface 6 is dry without any coating of adhesive material attached to it. Comparison with particle collection on a wetted surface, curve A in FIG. 4, or with particle collection on a surface covered by a coating of adhesive material, the 12.5 Liter min$^{-1}$ curve in FIG. 10, shows that the collection efficiency is reduced, but still acceptable, depending on the particle size range collected. In contrast, the collection efficiency of a dry AGI-30 impinger, curve K in FIG. 11, is very low. It is concluded that projecting the aerosol particles toward the inner surface 6 and then removing them from the swirling flow avoids or significantly reduces particle bounce from the collection surface which affects the collection efficiency in devices using other aerosol particle collection methods.

While certain preferred embodiments of the present invention have been disclosed in detail, it is to be understood that various modifications in its structure may be adopted without departing from the spirit of the invention or the scope of the following claims.

I claim as my invention:

1. Method of collecting airborne particles and microorganisms entrained in air for subsequent identification of said microorganisms and particles., comprising (a) providing a vessel having an air intake, an air outlet, and a substantially cylindrical surface, (b) placing a liquid in said vessel, and, while retaining said liquid therein, (c) drawing said air at a controlled rate through said air intake of said vessel by directing said air toward said liquid and said substantially cylindrical surface through at least one nozzle having a nozzle diameter in the range of 0.05 mm to 20 mm at an angle towards said substantially cylindrical surface between 10 and 90 degrees from the axis of said substantially cylindrical surface and between 10 and 80 degrees from a tangent to said substantially cylindrical surface, to cause a substantial depression in said liquid while also causing said liquid to form a substantially concave swirling meniscus and avoid formation of bubbles, whereby said particles and said microorganisms are entrained in said liquid and (d) measuring the volume of air drawn through said vessel for relating said volume of air to the number of particles and microorganisms collected.

2. Method of claim 1, wherein said liquid is retained in said vessel while said air is drawn through said vessel.

3. Method of claim 1, wherein said air is directed toward said liquid through a plurality of nozzles, at a velocity of at least 10 cm sec$^{-1}$.

4. Method of claim 1 wherein said air is drawn at a velocity through at least one nozzle of at least ten centimeters per second.

5. Method of claim 4 wherein said air is drawn through at least three nozzles.

6. Method of claim 1 wherein said air is drawn at a rate from about five liters per minute to about 12.5 liters per minute.

7. Method of claim 4 wherein said air is drawn at a rate of from about five liters per minute to about 12.5 liters per minute.

8. Method of claim 5 wherein said air is drawn at a rate of from about five liters per minute to about 12.5 liters per minute.

9. Method of collecting particles and microorganisms from gas in which they are entrained comprising creating a vacuum to create a measured gas flow of said gas of about 0.1 to 1000 L min$^{-1}$ directed at an angle onto the inner surface of a vessel containing and retaining a liquid, said angle between 10 and 90 degrees from the axis of the inner surface of the vessel and between 10 and 80 degrees from a tangent to the inner surface of the vessel, to create a swirling gas motion which moves said liquid upward in said vessel to create a depression in said surface and a swirling concave meniscus shape to said liquid, whereby substantially no bubbles are formed in said liquid and said particles and microorganisms are collected in said liquid for relating to said measured gas flow.

10. Method of claim 9 wherein said gas flow is through at least one nozzle, with, a pressure drop across said at least one nozzle of 1 mm Hg to 1000 cm Hg.

* * * * *